US008027769B2

(12) United States Patent
Oualkadi et al.

(10) Patent No.: US 8,027,769 B2

(45) Date of Patent: Sep. 27, 2011

(54) DEVICE AND METHOD FOR CONTROLLING A VEHICLE FLAP OR A VEHICLE DOOR

(75) Inventors: Mustafa Oualkadi, Velbert (DE); Marc Zander, Ratingen (DE)

(73) Assignee: Edscha AG, Remscheid (DE)

( * ) Notice: Subject to any disclaimer, the term of this patent is extended or adjusted under 35 U.S.C. 154(b) by 832 days.

(21) Appl. No.: 11/824,873

(22) Filed: Jul. 2, 2007

(65) Prior Publication Data

US 2008/0046153 A1 Feb. 21, 2008

Related U.S. Application Data

(60) Provisional application No. 60/847,636, filed on Sep. 27, 2006.

(30) Foreign Application Priority Data

Jul. 3, 2006 (DE) ......................... 10 2006 030 986

(51) Int. Cl.

| | |
|---|---|
| ***E05F 11/14*** | (2006.01) |
| ***E05F 15/00*** | (2006.01) |
| ***E05F 5/00*** | (2006.01) |
| ***B60J 5/10*** | (2006.01) |

(52) U.S. Cl. .......................... 701/49; 49/340; 296/146.4

(58) Field of Classification Search .................... 701/45; 49/324–363; 296/146.4

See application file for complete search history.

(56) References Cited

U.S. PATENT DOCUMENTS 2,371,336 A * 3/1945 Levon ............................ 49/340
3,777,727 A * 12/1973 Kirchner et al. .............. 123/587
4,429,264 A * 1/1984 Richmond .................... 318/466
4,881,018 A * 11/1989 Kato et al. ........................ 318/9
5,099,690 A * 3/1992 Califano ......................... 73/510
5,123,671 A * 6/1992 Driessen et al. ........... 280/5.519
5,147,106 A * 9/1992 Bartelt et al. ................. 296/202
5,187,993 A * 2/1993 Nicholson et al. ........... 74/89.38
5,210,490 A * 5/1993 Munch et al. ............ 324/207.17
5,294,757 A * 3/1994 Skalski et al. ................ 187/393
5,304,751 A * 4/1994 Skalski et al. ................ 187/393
5,321,217 A * 6/1994 Traktovenko et al. ........ 187/409
5,448,856 A * 9/1995 Moore et al. .................... 49/340
5,468,042 A * 11/1995 Heinrichs et al. .......... 296/146.4

(Continued)

FOREIGN PATENT DOCUMENTS

DE 40 41 087 A1 7/1992

(Continued)

*Primary Examiner* — Mark Hellner

*Assistant Examiner* — Ari M Diacou

(74) *Attorney, Agent, or Firm* — Davidson, Davidson & Kappel, LLC

(57) ABSTRACT

The present invention relates to an apparatus and a method for controlling a vehicle flap or a vehicle door, the apparatus having a housing, a first end of which is pivotably coupled to one of the following: a vehicle flap or a vehicle door and a vehicle frame, and a second end of which is pivotably coupled to the other one of the following: a vehicle flap or a vehicle door and a vehicle frame, a drive control device which is arranged on the housing, and at least one sensor which is in the form of an acceleration sensor. An abovementioned apparatus and a method, in which simple and reliable movement as well as detection and evaluation of the movement may be ensured, is provided by virtue of the acceleration sensor being arranged on the housing, and the acceleration sensor detecting the acceleration of the vehicle flap or vehicle door.

22 Claims, 4 Drawing Sheets

U.S. PATENT DOCUMENTS

| | | | | | |
|---|---|---|---|---|---|
| 5,531,498 | A * | 7/1996 | Kowall | 296/146.4 |
| 5,588,258 | A * | 12/1996 | Wright et al. | 49/340 |
| 5,592,401 | A * | 1/1997 | Kramer | 702/153 |
| 5,615,593 | A * | 4/1997 | Anderson et al. | 91/24 |
| 5,652,789 | A * | 7/1997 | Miner et al. | 379/201.01 |
| 5,712,783 | A * | 1/1998 | Catanzarite | 701/37 |
| 5,787,636 | A * | 8/1998 | Buchanan, Jr. | 49/360 |
| 5,851,050 | A * | 12/1998 | Squire et al. | 296/146.4 |
| 5,896,703 | A * | 4/1999 | Wright et al. | 49/339 |
| 5,944,376 | A * | 8/1999 | Buchanan, Jr. | 296/146.4 |
| 6,185,868 | B1 * | 2/2001 | Kato | 49/339 |
| 6,318,025 | B1 * | 11/2001 | Sedlak | 49/341 |
| 6,321,158 | B1 * | 11/2001 | DeLorme et al. | 701/201 |
| 6,478,357 | B2 * | 11/2002 | Zhou | 296/56 |
| 6,485,081 | B1 * | 11/2002 | Bingle et al. | 296/76 |
| 6,516,567 | B1 * | 2/2003 | Stone et al. | 49/343 |
| 6,533,058 | B2 * | 3/2003 | Peter | 180/274 |
| 6,601,903 | B2 * | 8/2003 | Nakagome | 296/76 |
| 6,719,356 | B2 * | 4/2004 | Cleland et al. | 296/146.8 |
| 6,755,458 | B1 * | 6/2004 | Oberheide | 296/146.8 |
| 6,814,392 | B1 * | 11/2004 | Tomaszewski | 296/146.4 |
| 6,873,931 | B1 * | 3/2005 | Nower et al. | 702/151 |
| 6,904,642 | B2 * | 6/2005 | West | 16/50 |
| 7,071,644 | B2 * | 7/2006 | Kawanobe | 318/280 |
| 7,143,548 | B2 * | 12/2006 | Kleinmann et al. | 49/345 |
| 7,219,945 | B1 * | 5/2007 | Zinn et al. | 296/56 |
| 7,234,757 | B2 * | 6/2007 | Mitchell | 296/146.8 |
| 2001/0002451 | A1 * | 5/2001 | Breed | 701/36 |
| 2001/0042989 | A1 | 11/2001 | Greif | |
| 2001/0053999 | A1 * | 12/2001 | Feinberg | 705/14 |
| 2002/0017883 | A1 * | 2/2002 | Marcinkiewicz et al. | 318/254 |
| 2002/0174604 | A1 | 11/2002 | Lauderbach et al. | |
| 2004/0020127 | A1 * | 2/2004 | West | 49/333 |
| 2004/0116169 | A1 * | 6/2004 | Isfort et al. | 460/119 |
| 2005/0011129 | A1 * | 1/2005 | Vassy | 49/339 |
| 2005/0032527 | A1 * | 2/2005 | Sheha et al. | 455/456.1 |
| 2006/0006692 | A1 | 1/2006 | Takahashi et al. | |
| 2006/0043763 | A1 * | 3/2006 | Berklich et al. | 296/146.4 |
| 2006/0082186 | A1 * | 4/2006 | Bals | 296/146.1 |
| 2006/0082188 | A1 * | 4/2006 | Mitchell | 296/146.8 |
| 2007/0261310 | A1 * | 11/2007 | Porat et al. | 49/340 |
| 2007/0262609 | A1 * | 11/2007 | King et al. | 296/146.8 |
| 2009/0205256 | A1 * | 8/2009 | Valois | 49/137 |

FOREIGN PATENT DOCUMENTS

| | | | |
|---|---|---|---|
| DE | 198 29 731 | A | 1/2000 |
| DE | 101 19 340 | A1 | 10/2002 |
| EP | 1 614 846 | A1 | 1/2006 |

* cited by examiner

DEVICE AND METHOD FOR CONTROLLING A VEHICLE FLAP OR A VEHICLE DOOR

Priority is claimed to German Patent Application 10 2006 030 986.3, filed on Jul. 3, 2006, and to U.S. Provisional Patent Application 60/847,636, filed on Sep. 27, 2006, the entire disclosures of which are incorporated by reference herein.

BACKGROUND

The present invention relates to an apparatus for controlling a vehicle flap or a vehicle door.

DE 198 29 731 A1 shows an apparatus for controlling a vehicle flap, in which a vehicle flap is pivotably arranged on a vehicle frame. One or more sensors which are intended to detect objects which have come between the vehicle flap and the vehicle frame are arranged on the vehicle frame, thus preventing these objects from being squeezed between the vehicle flap and vehicle frame. However, it is disadvantageous that it is not possible to determine the absolute position of the vehicle flap using this arrangement of the sensor or sensors.

It is also known from practice to fit sensors to the vehicle flap or vehicle door of motor vehicles, said sensors detecting the movement of the vehicle flap or vehicle door during an opening movement and a closing movement and their measurement results being evaluated in order to control the movement of the vehicle flap or vehicle door. However, they have the disadvantage that the sensors must be fitted to the movable part, the vehicle flap or vehicle door, of the motor vehicle as separate components. This results in the need for expensive and complex cabling which has to be disadvantageously arranged in the vehicle flap, for example, and additionally has to be routed from the vehicle flap into the vehicle body. When the vehicle flap is pivoted, a gap is produced between the vehicle flap and the vehicle frame, which gap must be bridged by the cabling, with the result that the cable harness used is routed to the outside and is thus susceptible to interference. It is also disadvantageous that the sensor has to be fitted at a defined position.

DE 101 19 340 A1 shows an actuating system for a tailgate of a motor vehicle, in which a first end of a gas-filled compression spring, which assists an opening movement of the tailgate, is pivotably arranged on the motor vehicle tailgate and a second end of said spring is pivotably arranged on the vehicle body. The cylinder of the gas-filled compression spring or the tailgate is connected to a drive device arranged on the vehicle body by means of a cable device, the cylinder being able to be moved using the cable device, which is driven by the drive device, in such a manner that the gas-filled compression spring is tensioned and a closing movement of the tailgate is initiated. A sensor is arranged at the point at which the gas-filled compression spring is fastened to the vehicle body, said sensor being in the form of a rotary potentiometer and transmitting an electrical signal which is associated with the opening angle of the tailgate to a control device which is likewise arranged on the vehicle body. A comparison unit can be used to determine a variable which is proportional to the angular speed of the tailgate from the time-dependent profile of the signal transmitted by the sensor, said variable being able to be used, by comparing it with a reference speed in the case of a deviation, to determine whether an obstacle is disrupting the movement of the tailgate. The drive of the opening or closing movement of the tailgate can be accordingly adjusted or reversed if there is a disruption.

DE 40 41 087 A1 shows an apparatus for the motorized movement of window sashes, skylights or smoke extractor flaps in buildings. The apparatus comprises a plurality of actuating devices which are each driven using an electric motor. The actuating devices each comprise a displaceable spindle, one end of which is connected to a frame element of a skylight. The spindles can be displaced in a drivable manner into the respective housings of the actuating devices by operating the electric motors, an opening or closing movement of the skylight being initiated by this. The electric motors each have a sensor which measures the rotational speed of the electric motor and forwards it to a central control apparatus which is fixedly arranged on the building, calculates, on the one hand, the instantaneous opening angle of the skylight from the transmitted data and, on the other hand, sends control signals to the electric motors in order to ensure a uniform opening movement even when the actuating elements are subjected to different loads.

EP 1 614 846 A1 shows a drive device for a motor vehicle tailgate, in which, on the one hand, an opening movement of the tailgate is driven using a gas-filled compression spring whose ends are pivotably arranged on the tailgate and vehicle body, and which, on the other hand, has an actuating apparatus which is driven by a motor that is arranged such that it is fixed to the vehicle body, is fixedly arranged on the vehicle body and is connected to the tailgate by means of a link which is pivotably articulated to the tailgate. A pivoting movement of the link, which is driven by the motor, makes it possible to initiate and control an opening and closing movement of the tailgate. A sensor element which measures the revolution of the motor is provided on the motor of the actuating apparatus, thus making it possible to indirectly determine the opening speed and acceleration of the tailgate, which also makes it possible to determine the relative position of the tailgate. A further sensor element which can be used to detect whether the tailgate is in a closed position is arranged on the vehicle body approximately at the level of the lower end of the tailgate, thus providing a reference position for determining the absolute position of the tailgate.

SUMMARY OF THE INVENTION

An object of the present invention is to provide a control apparatus for simple and reliable movement of a vehicle flap or a vehicle door of a motor vehicle of the type described above. Another object of the present invention is to provide a method for simple and reliable detection and evaluation of the movement for controlling a vehicle flap or a vehicle door of the type described above.

In accordance with a preferred embodiment of the present invention, an apparatus for controlling a vehicle flap comprises a housing having a first end and a second end, the first end being pivotably coupled to one of the vehicle flap and the vehicle frame, and the second end being pivotably coupled to the other of the vehicle flap and the vehicle frame, a drive apparatus which is arranged such that it is fixed to the housing, a drive control device for controlling the drive apparatus, and at least one sensor for detecting the position of the vehicle flap, wherein the drive control device is fixedly arranged to the housing, and wherein the acceleration sensor is arranged on a part which can be moved with respect to the vehicle frame.

In accordance with another preferred embodiment of the present invention, a vehicle flap arrangement comprises a vehicle flap being displaceably attached to a vehicle frame; a driving device for driving an opening and closing movement of the vehicle flap; a drive control device; and a sensor for measuring the position and movement of the vehicle flap; wherein the driving device, the drive control device and the sensor are provided moveably with respect to the vehicle frame.

In accordance with another preferred embodiment of the present invention, a system for detecting disturbances in a driven motion of a moveable element of a vehicle comprises a driving device for driving the moveable element, a driving control device for steering the driving device, and an acceleration sensor for detecting the acceleration of the moveable element, wherein, when the detected acceleration exceeds a predetermined acceleration value, a disturbance condition is determined.

In accordance with another preferred embodiment of the present invention, a method for controlling a driven movement of a vehicle flap with respect to a vehicle frame comprises the steps determining acceleration data of the vehicle flap using an acceleration sensor, calculating the current position of the vehicle flap from said determined acceleration data, determining deviations of the determined acceleration data from stored values of desired acceleration data according to a recorded movement of the vehicle flap, and adjusting the driving of the movement according to said deviations.

For a vehicle flap or a vehicle door, the magnitude and direction of acceleration over the course of movement generally varies monotonously and continuously, in terms of magnitude and/or direction, over the entire movement sequence as a whole, with the result that one advantage of the method and of the apparatus according to preferred embodiments of the present invention can be seen in the fact that each phase of the movement of the vehicle flap or vehicle door can be clearly detected and characterized using the detected acceleration. On the basis of detection of the acceleration of the vehicle flap or vehicle door using an acceleration sensor, the movement of the vehicle flap or vehicle door can be followed and the drive of the vehicle flap or vehicle door can be controlled over the movement range using a downstream drive control device.

Arranging the acceleration sensor on the housing instead of on the vehicle flap or vehicle door is advantageous since the sensor is thus provided on a part that is close to the vehicle body and expensive cabling of the sensor may be avoided. Common cabling can also be provided for the drive control device that is arranged in the housing and the sensor, thus advantageously reducing the outlay on cabling for the apparatus for controlling the vehicle flap or vehicle door. A compact design can be achieved as a result of the acceleration sensor being integrated with the drive control device.

It is also advantageous that the acceleration sensor can be arranged at places of the housing which, during movement of the vehicle flap or vehicle door, undergo a particularly pronounced and characteristic movement and thus an acceleration whose magnitude and direction can be easily detected, with the result that the movement of the vehicle flap or vehicle door can be effectively detected and the drive can easily engage with the controller in a regulating manner.

Another advantage can be seen in that it may be possible to dispense with a second sensor which constitutes a reference for the first sensor, with the result that it may be possible to use a single sensor to detect the movement of the vehicle flap or vehicle door over the entire movement range and to control the drive of the movement. A functional controller for a vehicle flap or a vehicle door thus may be provided with minimum outlay.

The opening movement and the closing movement of the vehicle flap may be produced by the drive control device. However, this pivoting speed of the vehicle flap may not satisfy people (i.e. people may want the vehicle flap to be opened and closed faster than by the drive device). If the pivoting movement of the vehicle flap is intended to be increased, the person may want to achieve this by subsequently pushing the vehicle flap. In a preferred embodiment of the present invention, this increase in the pivoting movement can be determined by the acceleration sensor as an additional acceleration. As soon as the acceleration sensor determines this, the drive device may be used to inform that the drive will continue to assist the movement of the vehicle flap by increasing the power. This increases the closing or opening movement of the vehicle flap.

It also may be possible to slow down the opening or closing movement of a vehicle flap, in which case the person retards the vehicle flap, as a result of which the acceleration sensor registers retardation (i.e. a negative acceleration). The drive device may be then instructed to reduce the movement speed of the vehicle flap.

In addition, as a result of the sensor being configured on the housing, the flap position may be safely and reliably determined by the acceleration sensor after the voltage supply for the drive device has failed, for example as a result of a car battery failing or as a result of a car battery being dismantled due to repair. Even if the vehicle flap is pivoted during voltage failure, the position of the vehicle flap may be safely and reliably determined by the acceleration sensor after voltage failure.

Disruptions in the movement sequence may correspond to an acceleration of the vehicle flap or vehicle door counter to the direction of movement which may be actually intended. Since the acceleration which actually acts on a vehicle flap or vehicle door may be detected directly, in particular without the need to indirectly form the difference between measured variables of two or more sensors, and the acceleration may be detected as a regulating variable without the interposition of expensive computation electronics which are needed to form the difference, another advantage may be that the disruption in the movement sequence of the vehicle flap or vehicle door can be detected very quickly.

Another advantage may be that, in the event of disruption, the detected acceleration, in particular the deviation of the detected acceleration from desired values which correspond to disruption-free movement of the vehicle flap or vehicle door, may provide an indication as to the type of disruption in the movement of the vehicle flap or vehicle door in order to stop or partially reverse the drive of the vehicle flap or vehicle door, for example. If the vehicle flap or vehicle door bumps into an object, for example if a user's hand gets caught, another easily detectable deviation of the acceleration may be provided as gradual catching of a flexible object during movement of the vehicle flap or vehicle door.

The current acceleration advantageously may be a measured variable which can be easily detected and for which small and powerful sensors which operate reliably may be available at low cost.

Provision may be preferably made of sensors which are based on the thermodynamic principle or operate in accordance with the principle of moving masses, provided that the respective sensors provide a value for the magnitude and, if appropriate, the direction of the detected acceleration as an output signal and are not only used as inclination sensors.

Sensors based on the thermodynamic principle may provide a gas stream in an enclosed volume. The gas stream may be driven by a temperature difference and be displaced from a state of equilibrium under the action of acceleration, which may be easily detected electronically as a change in current intensity or resistance using thermocouples, for example.

Sensors which operate on the principle of moving masses may have a mostly flat element which can be displaced in the manner of a spring in an enclosed volume and may be displaced under the action of acceleration. This displacement can be read and detected, for example, as a change in capacitance or frequency.

A method according to a preferred embodiment of the present invention for controlling the movement of the vehicle flap or vehicle door provides for the acceleration of the vehicle flap or vehicle door to be detected by at least one acceleration sensor which is arranged on the housing, for example by a sensor having the method of operation described above.

The detected acceleration may be expediently evaluated in accordance with the method in such a manner that it may be compared with desired values. Deviations of the actual detected acceleration from the desired values may then indicate disruptions in the sequence of movement of the vehicle flap or vehicle door. Such evaluation may be simple to carry out and may lend itself to a situation which is common in practice and in which the vehicle flap or vehicle door is moved on a fixed reproducible path. The desired values may preferably correspond to those accelerations which the vehicle flap or vehicle door undergoes on the fixed path, which may be considered to be expedient, and which thus may characterize an ideal movement of the vehicle flap or vehicle door.

A method according to a preferred embodiment of the present invention may preferably provide for the deviation of the detected acceleration from the desired values to be determined.

In a method according to a preferred embodiment of the present invention, the comparison may be preferably carried out in the drive control device. The desired values may be input to a data store which may be integrated in the drive control device, for example in the form of data which can be adjusted when producing and adjusting the vehicle flap or vehicle door. In order to compare the detected accelerations with the desired values, the drive control device may expediently comprise an evaluation unit which at least may qualitatively compare the detected accelerations with the desired values.

A method according to a preferred embodiment of the present invention may preferably provide for a deviation of the detected accelerations from the desired values to be quantitatively determined. In the event of a disruption in the movement sequence of the vehicle flap or vehicle door, information regarding the type and extent of disruption is thus advantageously available, so that the disruption can be located and eliminated, if necessary.

A method according to a preferred embodiment of the present invention may also preferably provide for control signals to be generated on the basis of the deviation determined, and for the control signals to regulate the movement of the vehicle flap or vehicle door.

A method according to a preferred embodiment of the present invention also may preferably provide for a threshold value to be predefined, and for the drive control device to transmit a control signal to the drive if the detected acceleration exceeds the threshold value. In this case, the threshold value may have the task, in particular, of preventing even minimal deviations of the detected acceleration from the desired values from blocking the drive of the vehicle flap or vehicle door. Such minimal deviations may occur during operation of the vehicle flap or vehicle door in the case of wear and tear or as a result of aging, for example.

The control signal emitted by a system according to a preferred embodiment of the present invention in the event of a disruption being detected may be, for example, an acoustic and/or optical warning signal which warns the user of the vehicle flap or vehicle door of a possible risk or may generally indicate the presence of the disruption. As an alternative or in addition to this, the control signal may cause the drive of the vehicle flap or vehicle door to be stopped. The control signal may preferably cause the drive to be stopped and the vehicle flap or vehicle door to then be briefly moved in the opposite direction in order to remove possible catching of a hand as a disruption, for example.

For a method according to a preferred embodiment of the present invention, it may be advantageous if the acceleration detected by the acceleration sensor is evaluated directly without further processing. In a system according to a preferred embodiment of the present invention for controlling the movement of the vehicle flap or vehicle door, the detected acceleration can thus be made available to the drive control device in the quickest manner without intermediate steps. Such direct evaluation may be possible, in particular, when contributions of disruptive influences on the detected acceleration, for example shaking or sticking of the mechanism or the drive of the vehicle flap or vehicle door during movement, vibration of the vehicle body or inclination of the vehicle body, are eliminated or are at least reduced to an extent which may be irrelevant to the control of the drive.

In order to be able to reliably eliminate the influence of the mentioned disruptive influences on the control of the drive, the method may expediently provide for the detected acceleration to be modified before it is evaluated.

A method according to a preferred embodiment of the present invention for controlling the movement of the vehicle flap or vehicle door may be advantageously designed in such a manner that the steps which are mentioned below by way of example can be carried out by the sensor and/or by the drive control device.

Sensors such as the acceleration sensors which were mentioned above by way of example and operate in accordance with the thermodynamic principle or the principle of moving masses generally do not detect the acceleration directly but rather a measured variable which may be dependent on the acceleration and assigned to a value for the acceleration in a subsequent step of the method. The sensors which have been mentioned and may operate in accordance with the thermodynamic principle may measure, for example, an electrical variable such as a resistance or thermocurrent. The sensors which have been mentioned and may operate in accordance with the principle of moving masses likewise may directly detect a capacitance or a frequency, with the result that the measured variable detected may be assigned to a corresponding value for the acceleration. In order to provide that the measured variables detected by different sensors, in particular by different types of sensors, can be compared, it may be expedient to assign the measured variables detected to a respective corresponding acceleration.

An apparatus according to a preferred embodiment of the present invention thus preferably may comprise sensors which can be used to assign the measured variable detected to the accelerations. Alternatively, provision may be made for the measured variables detected to be assigned to the accelerations by the drive control device.

For sensors, it is generally known practice to assign standard conditions, in particular a standard temperature, to the respective sensor, and to detect the acceleration under measurement conditions, in particular at a measurement temperature. In particular, measured values which have been detected under different conditions which deviate from the standard conditions generally can be compared only to a limited extent. With regard to the ability to compare the accelerations detected under different conditions, in particular when comparing the detected accelerations with predefined desired values which characterize an ideal movement sequence, the method may preferably provide for the acceleration which has been detected under the measurement conditions, in particular at the measurement temperature, to be assigned an acceleration which corresponds to it under standard conditions, in particular at a standard temperature.

Measurement conditions, in particular the measurement temperature, may be preferably concomitantly detected by the acceleration sensor itself. Such assignment to the acceleration detected under the measurement conditions, in particular at the measurement temperature, can be carried out by the drive control device, for example, for inexpensive acceleration sensors of simple construction. As an alternative to this, provision may be made for the sensor to carry out the assignment.

It also may be expedient for a method according to a preferred embodiment of the present invention to detect the gravitational acceleration whose time-dependent and location-dependent magnitude may be superimposed on the accelerations occurring during movement of the vehicle flap or vehicle door and can thus distort evaluation of the detected accelerations. The contribution of gravitational acceleration to the detected acceleration may also depend on the orientation of the body of the motor vehicle relative to the perpendicular, for example when the motor vehicle is on an inclined plane or on a curb. Therefore, it may also be expediently provided for the detected acceleration to be additionally corrected by the detected magnitude of gravitational acceleration.

A method according to a preferred embodiment of the present invention accordingly may provide for the gravitational acceleration to be detected. The gravitational acceleration preferably should be detected independently of the movement of the vehicle flap or vehicle door, expediently at a point in time immediately before the vehicle flap or vehicle door begins to move and thus before the vehicle flap or vehicle door moves, that is to say chronologically separate from the movement of the vehicle flap or vehicle door. As an alternative to this, provision may be made for the gravitational acceleration to be detected by a sensor which is integrated in the vehicle body, such as a rollover sensor or a crash sensor, for example, and transmitted to the drive control device. As an alternative to this, a separate sensor which is fixed to the vehicle body may be provided for the purpose of detecting the gravitational acceleration even during movement of the vehicle flap or vehicle door. In the two previous examples, the contribution of gravitational acceleration is detected by a sensor which is independent of the acceleration sensors, in particular is structurally separate from the acceleration sensors.

Although sensors can, in principle, preferably correct the detected acceleration by the contribution of gravitational acceleration, the sensors may provide the detected acceleration and the contribution of gravitational acceleration as two separate output signals and the correction by the contribution of gravitational acceleration may be carried out by the drive control device.

Filter parameters may be provided for the purpose of suppressing, in particular, the contributions on account of the mechanism shaking during movement in order to evaluate the detected acceleration, a method according to a preferred embodiment of the present invention preferably providing for the detected acceleration to be compared with the filter parameters and not to be evaluated if the detected acceleration is less than the filter parameters, for example.

A method according to a preferred embodiment of the present invention may provide for the detected acceleration to be compared with the filter parameters, in which case the acceleration may not be evaluated if the detected acceleration is less than the filter parameters.

An apparatus according to a preferred embodiment of the present invention may provide for preferably adjustable filter parameters to be assigned to the sensor. The sensor or alternatively the drive control device may preferably compare the filter parameters and the detected acceleration.

A method according to a preferred embodiment of the present invention also may preferably provide for the detected acceleration to be digitized, so that there are only a finite number of values for the detected acceleration and the detected acceleration can be easily compared, in particular, with desired values which likewise represent only a finite set of values.

An apparatus according to a preferred embodiment of the present invention accordingly may provide for the sensors to be able to digitize the detected acceleration. As an alternative to this, the drive control device may carry out the digitization.

With an appropriately designed sensor which comprises microprocessors, for example, the modifying steps mentioned above by way of example may be carried out by the sensor itself. This may afford the advantage that the drive control device may be relieved of this task, which may prove to be expedient, in particular, in the case of older drive control devices with limited performance. Older models, in particular, thus may be retrofitted with appropriately powerful sensors.

On the other hand, sensors which do not carry out the modifying steps mentioned may be less expensive and less susceptible to interference. To this end, in a preferred embodiment of the present invention, the drive control device should be designed in such a manner that it can carry out the modifying steps mentioned.

The steps which have been mentioned and are involved in modifying the detected acceleration may be carried out electronically, for example. Therefore, it may be expedient if the acceleration sensors provide electronic output signals.

Apparatuses and methods according to the present invention may be used not only for a vehicle flap or a vehicle door but rather for all drive systems in a vehicle, such as windows, covers, panels and the like, for example.

DESCRIPTION OF THE DRAWINGS

The present invention will be described and explained in more detail below with reference to an exemplary preferred embodiment and with reference to the attached drawings.

DETAILED DESCRIPTION

Figure 1:
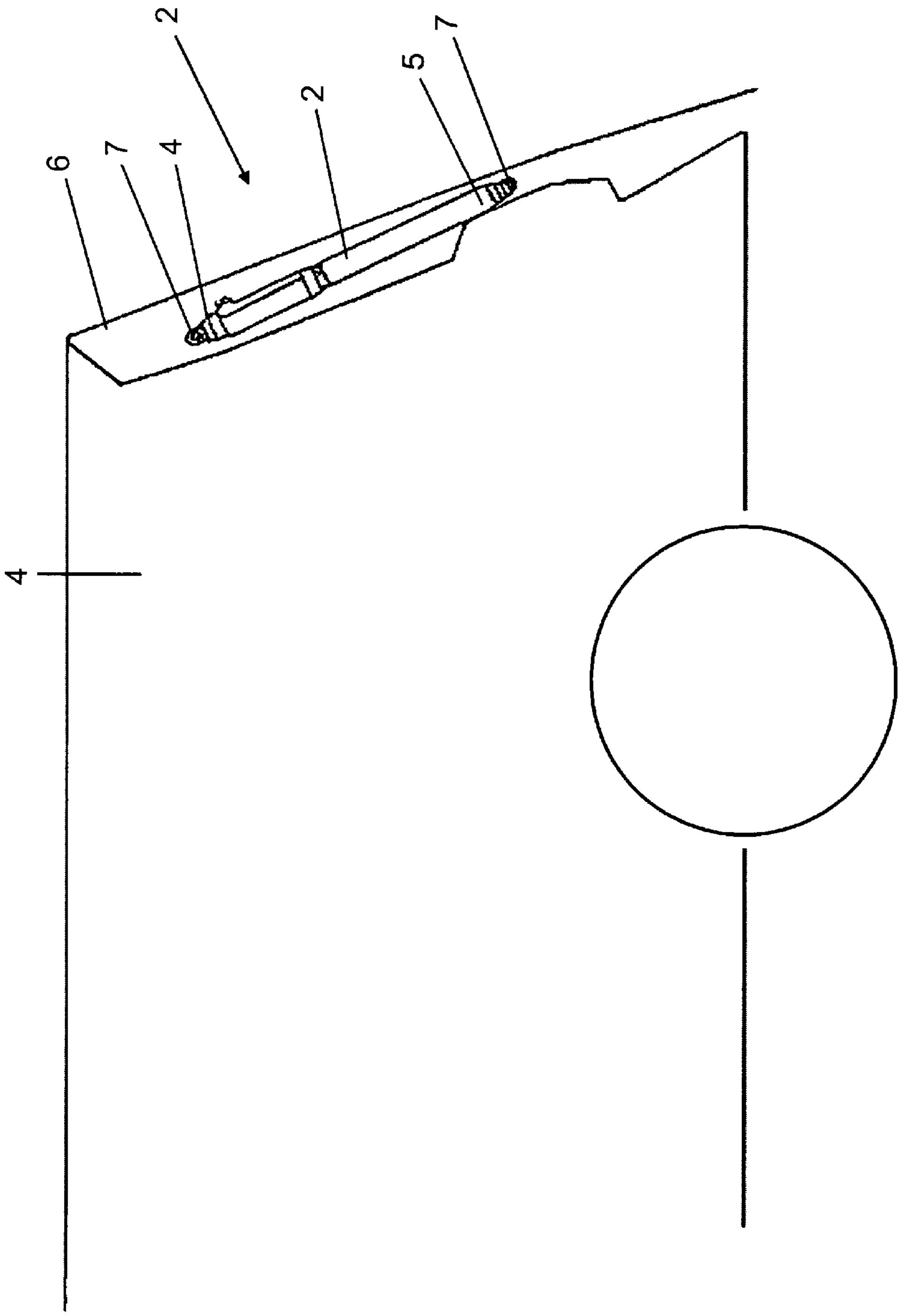
FIG. 1 shows a diagrammatic illustration of a preferred exemplary embodiment of an apparatus according to the invention, in which the vehicle flap is closed.
Figure 2:
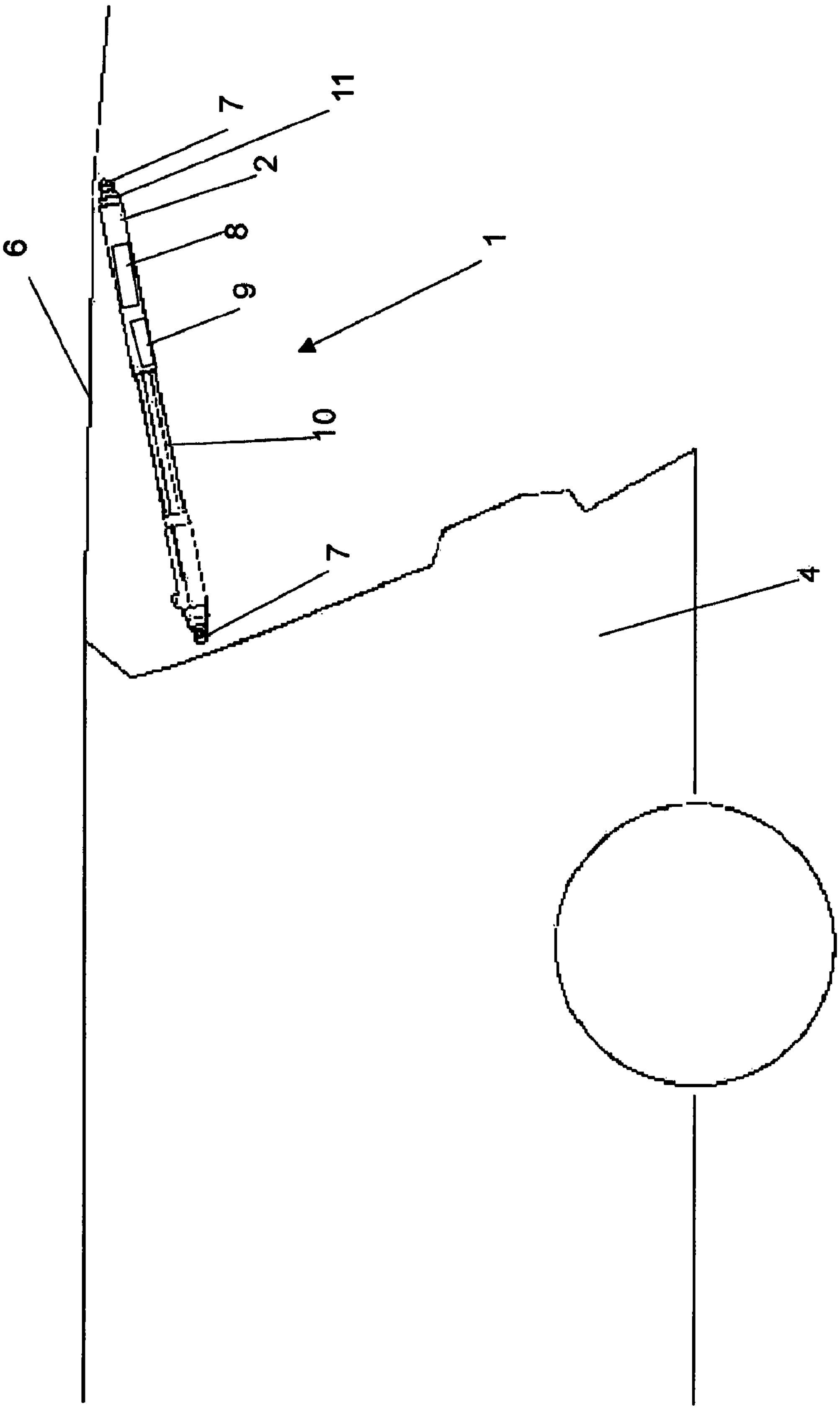
FIG. 2 shows the apparatus from FIG. 1, in which the vehicle flap is open.
Figure 3:
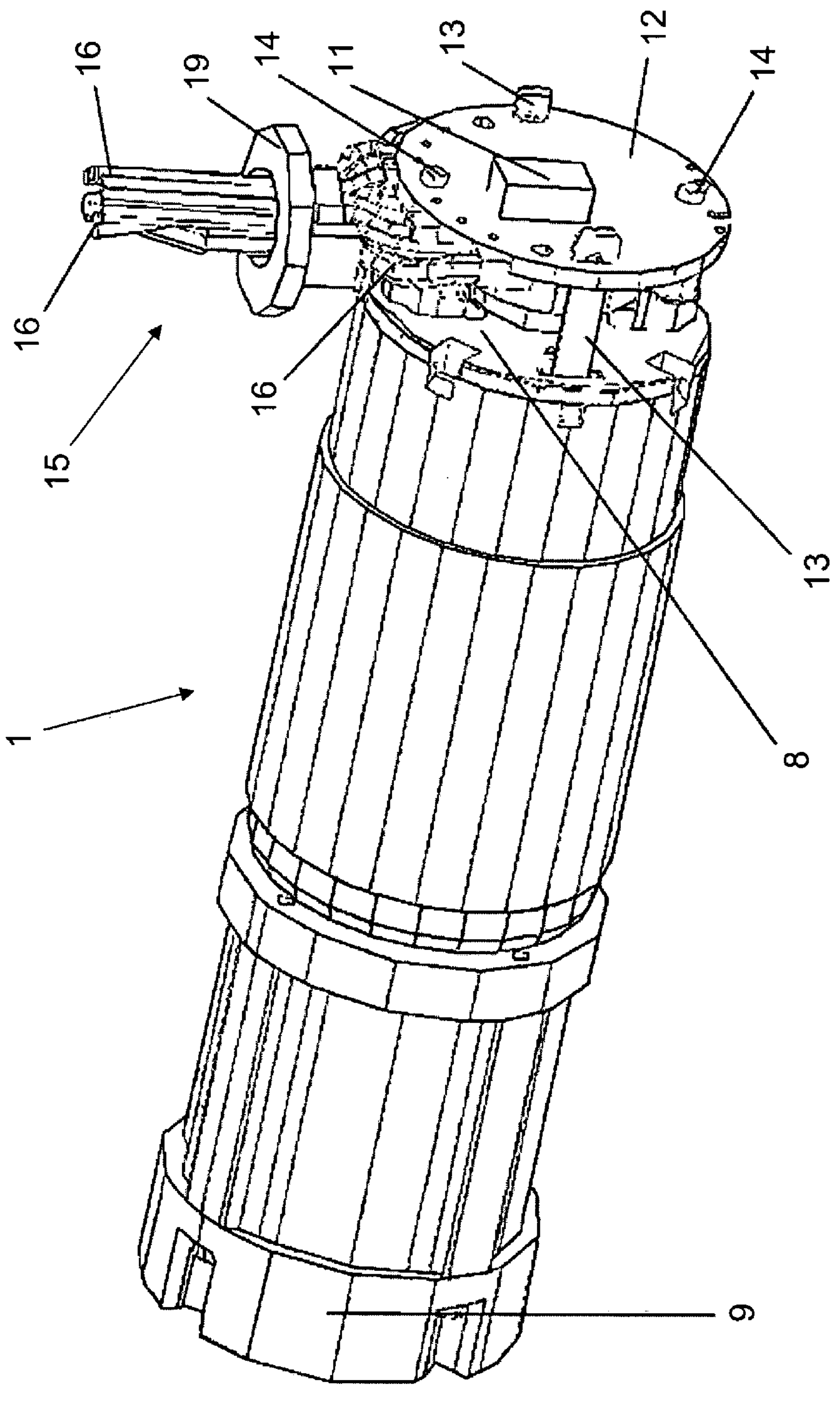
FIG. 3 shows an enlargement of a detail of the apparatus according to the invention from FIG. 1.
Figure 4:
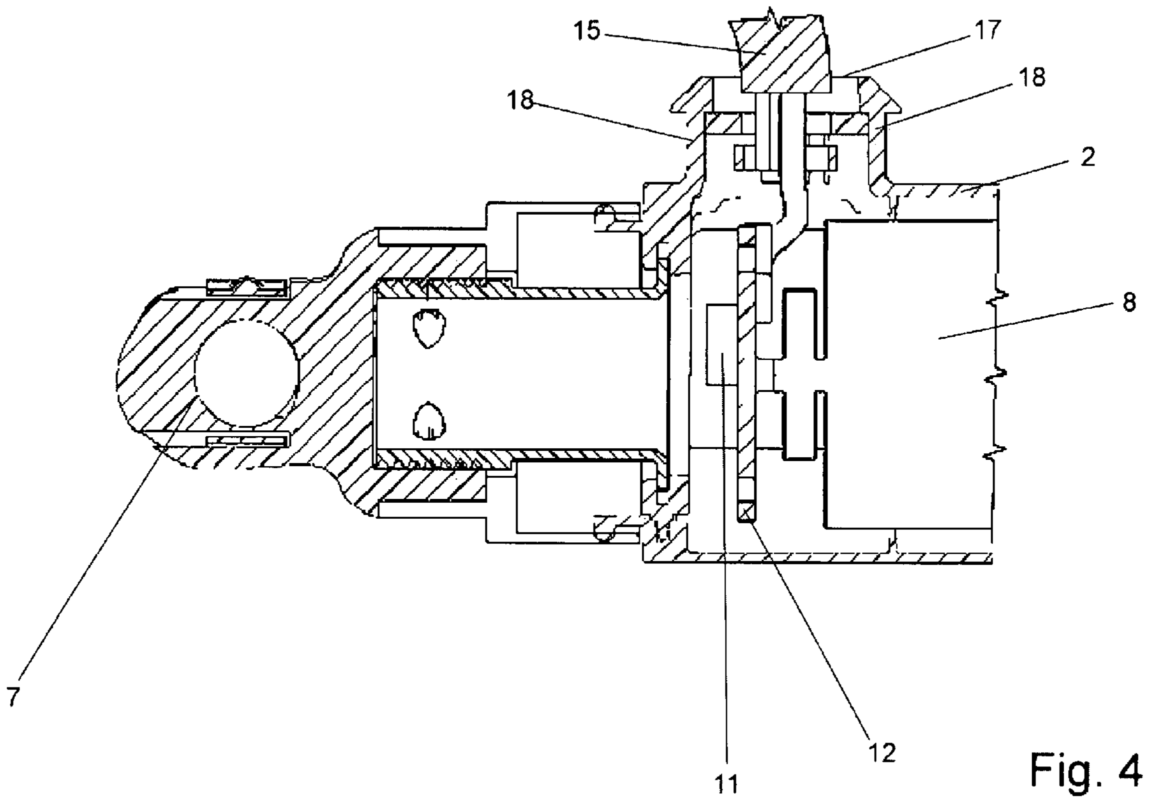
FIG. 4 shows a cross-sectional illustration of the apparatus according to the invention from FIG. 3.

FIGS. 1 to 4 show one preferred exemplary embodiment of the apparatus 1 according to the present invention for controlling a vehicle flap, in which a first end 3 of a housing 2 is pivotably arranged on a vehicle frame 4 and a second end 5 of said housing is pivotably arranged on a vehicle flap 6. The housing 2 is respectively pivotably coupled to the vehicle frame 4 and the vehicle flap 6 using a ball bearing 7, a respective ball socket being provided, for example, at the first end 3 and the second end 5 of the housing 2 for a ball-ended pin which is arranged on the vehicle frame 4 and on the vehicle flap 6. The ball-ended pin is rotatably mounted in the ball socket, with the result that the housing 2 ensures the connection in any position during the pivoting movement of the vehicle flap 6.

The ball-ended pin may also be arranged at the first end 3 and the second end 5 of the housing 2 and the ball socket may be arranged on the vehicle frame 4 and the vehicle flap 6.

The housing 2 is in the form of a hollow cylinder, a drive control device 8 being provided in the hollow cylinder in order to produce the pivoting movement of the vehicle flap 6 both in the opening direction and in the closing direction. The drive control device 8 comprises a drive 9 which is in the form of an electric motor and is coupled to a spindle 10, the rotation produced by the electric motor 9 being transferred to the spindle 10. The spindle 10 is rotatably mounted in a spindle nut, with the result that the effective length of the spindle 10 for the apparatus 1 changes if the electric motor 9 rotates the spindle 10, the spindle 10 being pulled through the spindle nut. When the effective length of the spindle 10 is lengthened, the length of the apparatus 1 is lengthened and the vehicle flap 6 is pivoted in the opening direction. Conversely, when the effective length of the spindle 10 is shortened, the apparatus 1 is also shortened and the vehicle flap 6 is pivoted in the closing direction.

The electric motor 9 has two directions of rotation, as a result of which the vehicle flap 6 can be operated by the drive control device 8 both in an opening movement and in a closing movement. As a result, the pivoting movement of the vehicle flap 6 can be reversed by the drive control device 8, for example in the event of a hand or an object getting caught between the vehicle frame 4 and the vehicle flap 6, and further catching can be avoided.

A sensor which is in the form of an acceleration sensor 11 is arranged on the housing 2 which is in the form of a hollow cylinder. The acceleration sensor 11 is coupled to the drive control device 8, the acceleration sensor 11 being arranged on a printed circuit board 12 which is connected to the drive control device 8 so that the data determined by the acceleration sensor 11 can be transmitted to the drive control device 8.

The printed circuit board 12 is mounted on the housing 2 using two retaining elements 13, the retaining elements 13 being routed through corresponding bores in the printed circuit board 12. Provision may be made for the retaining elements 13 to have slight flexibility so that vibrations and the like, for example, are damped by the retaining elements 13 and are not transferred to the printed circuit board 12 and the electronics arranged there. These electronics comprise, for example, protective circuitry in order to protect the acceleration sensor 11 from vibrations and to provide antistatic protection.

Two spacing elements 14 which are uniformly arranged opposite one another at a respective angle of 180 degrees over the circular cross section of the printed circuit board are provided on that side of the printed circuit board 12 which faces away from the drive control unit 8. The spacing elements 14 boost the damping action for the printed circuit board 12.

A cable harness 15 which routes a plurality of electrical cables 16 to the outside from the housing 2 so that the cables 16 can be connected to an electrical power source, for example a car battery, is arranged on the printed circuit board 12.

The cables 16 comprise the supply for the drive control device 8, the electric motor 9 and the acceleration sensor 11 as well as the protective circuitry. The advantage of the acceleration sensor 11 being arranged on the housing 2, thus providing simple and straightforward cabling for the electrical and electronic components of the apparatus 1 for controlling the vehicle flap 6, can be clearly seen.

The printed circuit board 12 and the cable harness 15 are connected to one another by means of a plug-in connection or a soldered connection. The housing 2 has an opening 17 for routing the cables 16. The opening 17 is such that a wall 18 of the housing 2 extends vertically from the housing 2, with the result that the wall 18 produces a small hollow cylinder which is vertically oriented to the outside. The individual cables 16 of the cable harness 15 are routed to the outside through the opening 17 formed by the wall 18 and are held together by a ring 19.

It has to be understood that the walls 18 may also be at any other angle to the housing 2 depending on the manner in which the further routing for the cable harness 15 is predefined on the basis of the vehicle body geometry.

With reference to FIGS. 1 to 4, the method according to the invention functions as follows:

When the vehicle flap 6 is pivoted, the acceleration sensor 11 records measurement data. Depending on the design, for example gravitation sensor, thermocouples, sensor based on gas technology etc., the acceleration sensor 11 detects corresponding data. In this case, the data are unambiguously assigned to the acceleration of the vehicle flap, with the result that the acceleration sensor 11 detects the acceleration of the vehicle flap 6.

The measurement data from the acceleration sensor 11 are used to provide a signal which is determined by all three spatial directions, with the result that the absolute position of the acceleration sensor 11 is determined. As a result of the comparison with particular starting data and desired values for the pivoting movement of the vehicle flap 6, the absolute position of the vehicle flap 6 is determined by means of a corresponding comparison of the starting data and desired values with the measurement data.

It has to be understood that the measurement or evaluation of one or two spatial directions only is also possible using the acceleration sensor 11 but this depends on the desired application. Provision may thus be made, for example, for the apparatus 1 and the vehicle flap 6 to be pivoted in only one plane, so that the absolute position of the vehicle flap is determined by two coordinates.

However, in most applications, the apparatus 1 pivots in three spatial directions, for example if the apparatus 1 is pivotably arranged on the vehicle frame 4 and the vehicle flap 6 using ball bearings 7. In these cases, it is necessary to detect all three spatial directions in order to determine the absolute position.

The measurement data detected by the acceleration sensor 11 are forwarded as an output signal to the drive control device 8 and are evaluated in the latter. The measurement data are evaluated in such a manner that the evaluated data are processed further, for example corresponding voltages, currents, frequencies etc. which can be electrically or electronically processed further by the drive control device 8 are thus assigned to the measurement data.

It has to be understood that the measurement data can also be evaluated and converted by the acceleration sensor 11.

During the pivoting movement of the vehicle flap 6, the apparatus 1 and the drive control device are moved on a predetermined pivoting path. Particular desired values that are stored in a data store of the drive control device 8 correspond to this movement. During the pivoting movement of the vehicle flap 6, the acceleration sensor 11 permanently determines measurement data which are transmitted to the drive control device 8 and are compared with the desired values by an evaluation unit of the drive control device 8 in order to ensure an ideal pivoting path for the vehicle flap 6.

If the measurement data determined by the acceleration sensor 11 now deviate from the desired values, the drive control device 8 will use the type of deviation to determine how it will react. If, for example, the acceleration sensor 11 determines a decreasing acceleration, which can be attributed, for example, to the fact that an object is caught between the vehicle frame 4 and the vehicle flap 6, this reduction is detected by the drive control device 8, the drive control device 8 converting these data into an electrical or electronic signal and transmitting this signal to the electric motor 9 so that the electric motor 9 adjusts or reverses the pivoting movement of the vehicle flap 6. This avoids further catching of the object and the object is released by virtue of the pivoting movement of the vehicle flap 6 being reversed by the electric motor 9.

It has to be understood that further filter parameters may be assigned to the desired values in order to preclude very small deviations from the desired values, for example slight shaking of the vehicle flap by a user, resulting in the pivoting movement of the vehicle flap being stopped.

The above invention has been described using an exemplary embodiment in which a vehicle flap is pivotably arranged on a vehicle frame. It has to be understood that the control apparatus may also be used for a vehicle door, a window or any other desired component which is pivoted with respect to another component.

It also has to be understood that further measurement data may also be recorded by the acceleration sensor, for example the gravitational acceleration, the measured acceleration of the vehicle door being corrected by the value of gravitational acceleration when being evaluated by the drive control device or the sensor. In addition, further sensors may also be provided. In particular, a further sensor which measures the gravitational acceleration and may be arranged, for example, on a component which is fixed to the vehicle body, for example the vehicle frame, may thus be provided.

What is claimed is:

1. An apparatus for controlling a movement of a vehicle flap in a vehicle frame, the apparatus comprising:

a housing having a first end and a second end, the first end being pivotably coupled to one of the vehicle flap and the vehicle frame, and the second end being pivotably coupled to the other of the vehicle flap and the vehicle frame;

a drive apparatus being arranged such that it is fixed to the housing;

a drive control device for controlling the drive apparatus; and at least one acceleration sensor for detecting the position of the vehicle flap, wherein the drive control device is fixed to the housing, and wherein the acceleration sensor is arranged on a part which can be moved with respect to the vehicle frame.

2. The apparatus as claimed in claim 1 wherein the acceleration sensor is fixed to the housing.

3. The apparatus as claimed in claim 1 wherein the drive apparatus can drive the vehicle flap in an opening direction and in a closing direction.

4. The apparatus as claimed in claim 1 wherein the drive apparatus is an electric motor.

5. The apparatus as claimed in claim 1 wherein the at least one acceleration sensor comprises an output for providing an electronic output signal.

6. The apparatus as claimed in claim 1 wherein the detected acceleration can be converted into an electronic signal by the acceleration sensor.

7. The apparatus as claimed in claim 1 wherein the at least one acceleration sensor provides a digitized output signal.

8. The apparatus as claimed in claim 1 wherein the detected acceleration can be converted into a digital signal by the drive control device.

9. The apparatus as claimed in claim 1 wherein the at least one acceleration sensor is selected from the group consisting of sensors which operate in accordance with a thermodynamic principle and sensors which operate in accordance with a principle of moving masses.

10. The apparatus as claimed in claim 1 wherein the at least one acceleration sensor can detect an acceleration which is unambiguously assigned to the current acceleration of the vehicle flap which has a contribution of gravitational acceleration superimposed on it.

11. The apparatus as claimed in claim 1 wherein the at least one acceleration sensor can detect the contribution of gravitational acceleration to the detected acceleration independently of the movement of the vehicle flap.

12. The apparatus as claimed in claim 1 wherein measurement conditions of the acceleration sensor, in particular the measurement temperature, can be detected by the acceleration sensor.

13. The apparatus as claimed in claim 1 wherein the acceleration sensor is designed to transmit data to the drive control device.

14. The apparatus as claimed in claim 1 wherein the acceleration sensor is designed to process data, in particular to compare measurement data with predefined filter values.

15. The apparatus as claimed in claim 1 wherein the drive control device is designed to process data, in particular to compare measurement data with predefined filter values.

16. The apparatus as claimed in claim 1 wherein a data store is assigned to the drive control device, and wherein the data store comprises adjustable desired values which correspond to accelerations given advantageous movement of the vehicle flap.

17. The apparatus as claimed in claim 16 wherein the drive control device comprises an evaluation unit, and wherein the evaluation unit compares the detected acceleration with the desired values.

18. The apparatus as claimed in claim 1 wherein the drive control device comprises a regulating apparatus, the regulating apparatus regulating the opening or closing movement of the vehicle flap on the basis of measured values from the acceleration sensor.

19. The apparatus as claimed in claim 1 wherein the vehicle flap is selected from the group consisting of vehicle doors, vehicle front hoods, vehicle tailgates, vehicle liftgates and vehicle sliding doors.

20. A vehicle flap arrangement comprising:

a vehicle flap being displaceably attached to a vehicle frame;

a driving device for driving an opening and closing movement of the vehicle flap;

a drive control device; and a sensor for measuring the position and movement of the vehicle flap;

wherein the driving device, the drive control device and the sensor are provided on a housing movable with respect to the vehicle frame.

21. A system for detecting disturbances in a driven motion of a moveable element of a vehicle, the system comprising:

a driving device for driving the moveable element;

a driving control device for steering the driving device; and an acceleration sensor for detecting the acceleration of the moveable element, wherein, when the detected acceleration exceeds a predetermined acceleration value, a disturbance condition is determined;

wherein the movable element of the vehicle is a vehicle flap; and wherein the driving device, the driving control device and the acceleration sensor are arranged on a housing of the driving device, providing simple and straightforward cabling for electrical and electronic components of an apparatus for controlling the vehicle flap.

22. A method for controlling a driven movement of a vehicle flap with respect to a vehicle frame, the method comprising the steps of:

determining acceleration data of the vehicle flap using an acceleration sensor;

calculating the current position of the vehicle flap from said determined acceleration data;

determining deviations of the determined acceleration data from stored values of desired acceleration data according to a recorded movement of the vehicle flap;

adjusting the driving of the movement according to said deviations by rotating a spindle driven by an electric motor, wherein the electric motor and the spindle are located within a common housing; and wherein the acceleration sensor is arranged on the housing.

* * * * *